UNITED STATES PATENT OFFICE.

LOUIS ALBERT CONSTANT CHOLET, OF MONTREUIL-SOUS-BOIS, FRANCE.

PROCESS FOR PRESERVING IN THE FRESH CONDITION ORGANIC MATTERS AND PARTICULARLY MEAT AND FISH.

1,418,233.     Specification of Letters Patent.     Patented May 30, 1922.

No Drawing.     Application filed January 10, 1921. Serial No. 436,332.

*To all whom it may concern:*

Be it known that I, LOUIS ALBERT CONSTANT CHOLET, of 5 Rue Michelet, Montreuil-sous-Bois, Seine, France, chemist, have invented a Process for Preserving in the Fresh Condition Organic Matters and Particularly Meat and Fish, of which the following is a full, clear, and exact description.

The principal processes used up to this day for the preservation of meat are the following:

1—Freezing.
2—The use of antiseptics.
3—The desiccation more or less complete in the open air or by vacuum.
4—The treatment by the combined action of vacuum air and an antiseptic.

The effects of freezing are well known. They produce the disorganization of the tissues and the protection ceases as soon as the action of the cold is stopped.

The use of antiseptics, introduced in the meat, is prohibited by the regulations now in force which authorize only the use of creosote, but this antiseptic alters the taste of the meat (smoked meats).

The desiccation is effected in various ways and at various degrees. The products subjected to desiccation under the action of the air and of the sun have not in any way the appearance of fresh meat. Relating to partial desiccation by vacuum, it has numerous inconveniences. Under the action of vacuum, the meat swells, then in presence of the absorbents of water vapour, it dries. This desiccation however is not uniform. Very pronounced in the uncovered portions and on the sections, where the meat becomes porous, it does not reach the muscular tissue in the portions covered by an adipose tissue which comes away so to speak from the subjacent portions.

This irregular action is already very prejudicial, but quite as serious an inconvenience consists in the detachment of the different planes of tissues composing the meat; mouldiness develops, in fact, with great facility between these different planes.

Microbian life is not affected by vacuum; thus, the micro-organisms which have been able to enter inside during the manipulations re-take rapidly their activity when the conditions become favourable to them and this is the cause of numerous failures.

The appearance of meat treated by vacuum is characteristic. The meat swollen by the action of the vacuum dry up in this abnormal state; the superficial tissues lose their elasticity and when the normal pressure is re-established, they can no longer fit on the subjacent tissues; the meat thus presents corrugations and swellings having a disagreeable appearance.

The exaggerated loss of weight is prejudicial to its sale; on the other hand, the construction of vacuum apparatus of large dimensions necessary for an industrial working, presents a technical problem which is difficult to be solved and causes a very large outlay of money which, with the necessary accessories, considerably increases the first expenses.

For the treatment of meat by the combined action of an antiseptic, vacuum and air, two methods are used:

1—In the first, vacuum is used for causing the antiseptic to penetrate into the heart of the meat and at the same time a superficial desiccation is produced which is completed by a current of air.

Besides the above mentioned inconveniences, resulting from the use of vacuum, this method kills the living cell existing in the meat and diminishes, consequently, the digestibility of the product.

2—In the second method, the vacuum is adapted to eliminate the antiseptic used and to produce at the same time a superficial desiccation which is completed by a current of air. Although this method ensures the protection against the microbian action, it gives, however, products which, while free from antiseptics, present the same defects as those prepared by the two previously mentioned methods and caused by the action of vacuum; the meat has the same disagreeable appearance and the same difficulties for industrially carrying out the preservation are encountered.

This invention has for its object a new process, of easy application, which remedies all the inconveniences of the known processes indicated above and permits of preserving, in the fresh condition, organic substances in general, and more particularly meat and fish.

This process is based on the observation of this well known fact that when a meat dries quickly it is much more easily preserved than one which remains moist.

The process is composed of a combination of known means, which produces a result impossible to obtain by any of these means used separately.

The characteristic feature of the process consists in the simultaneous use of a sharp cold but not capable of causing the freezing of the meat and of a volatile antiseptic and in a subsequent treatment which consists in subjecting the meat to the simultaneous action of intense heat, of short duration and gradually decreasing the same and of a current of sterilized air which is adapted to entirely eliminate the antiseptic and has, moreover, for effect to give to the meat a slight and regular parchment-like surface.

Immediately after slaughtering, the meat to be preserved is subjected to the simultaneous action of cold and of a gaseous antiseptic applied by means of a slight draught. The sharp cold to be applied, which must not lower the temperature of the meat to −1° C. at the minimum, temperature at which begins the freezing of the meat, has for effect of paralyzing the life of the micro-organisms deposited on its surface during the various manipulations to which it is subjected during the slaughtering and of preventing them to penetrate inside, whilst the antiseptic, gaseous sulphur dioxid for instance, the action of which continues during the entire duration of the cooling, destroys them entirely. This method allows of reducing to the minimum the amount of sulphur dioxid to be used.

The meat is then subjected to the action of a violent current of sterilized air, brought to the temperature of about 50 to 60° C., and which constitutes the heating agent. This high temperature of the air is maintained during the time strictly necessary for rapidly reheating only the surface of the meat, without the action of the heat exerting itself too deeply. The temperature of the air is then gradually lowered.

Under the influence of the heat and of the current of air, the antiseptic is entirely eliminated, in less time and with less cost than by vacuum. The second result obtained consists in that the meat presents a slight and regular parchment-like surface. The sections look as if they were frozen and are not porous as when vacuum is used.

The meat which has been subjected to this treatment is ready to be stored.

The new process gives the following advantages:

1—The meat is not dried up, except in a very superficial and regular manner and it no longer contains any trace of antiseptic.

2—Contrarily to frozen meat, it is not affected by variations of temperature of 10 to 12° C.

3—Owing to the rapid cooling and very superficial re-heating, the loss in weight to which the meat may be subjected during the treatment is reduced to the minimum.

4—By doing away with the use of vacuum, the meat is not subjected to any distention; the different layers of tissues maintain their relative positions; the surface is neither corrugated or swollen. Finally, the surface of the sections is frozen and not porous and this cooperates in ensuring a satisfactory preservation of the meat. Its exterior appearance is, consequently, that of meat a few days old.

5—As the action of the antiseptic has only been superficial and has been exerted at the normal pressure, the living cell has remained intact; the digestibility of the meat thus treated is therefore the same as that of fresh meat.

6—Kept in a cool place, moderately aerated, the meat prepared in the described conditions preserve all their qualities during several months.

7—The carrying out of the process does not necessitate any special costly apparatus of delicate or difficult handling, as in the case in processes in which vacuum is used.

8—Its application can be easily effected on a large scale, with a very reduced staff.

Claims:

1. A process for the preservation, in the fresh state, of organic substances and more particularly meat and fish, which consists in subjecting the substance to be preserved to the simultaneous action of a sharp cold but not capable of causing the freezing of the substance and of a volatile antiseptic,—in then subjecting the substance to the simultaneous action of an intense heat of short duration, during a sufficient time for reheating only the surface of the substance treated and then gradually decreasing the same, and of a violent current of sterilized air.

2. A process for the preservation of meat in the fresh state, which consists in subjecting the meat to be preserved to the simultaneous action of a sharp cold but at a temperature not capable of causing the freezing of the meat, that is to say not lower than −1° C., and of a volatile antiseptic, gaseous sulphur dioxid for instance, during the entire duration of the refrigeration,— in then subjecting the meat to the action of a current of sterilized air, brought to a temperature of about 50 to 60° C., during a sufficient time for reheating only the surface of the meat and in then gradually lowering the temperature of this current of air.

The foregoing specification of my "Process for preserving in the fresh condition organic matters and particularly meat and fish," signed by me this 23rd day of December, 1920.

LOUIS ALBERT CONSTANT CHOLET.